(No Model.)
H. R. STIRLING.
MOWING MACHINE.
No. 601,911. Patented Apr. 5, 1898.
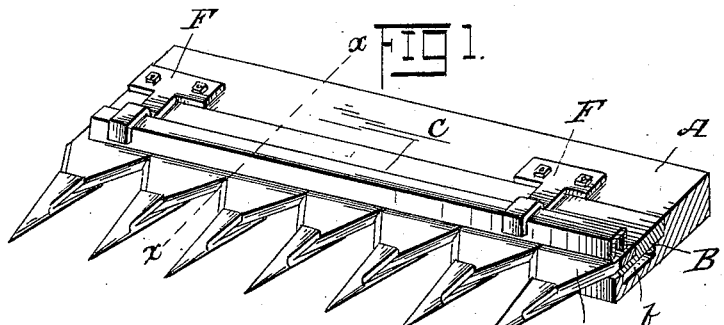
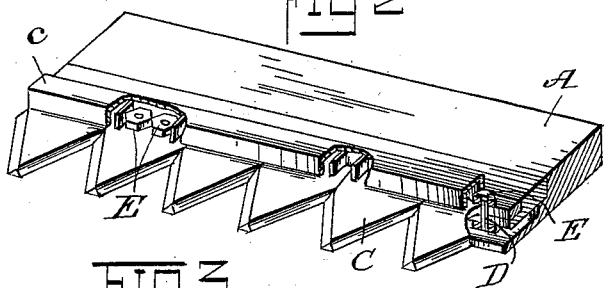
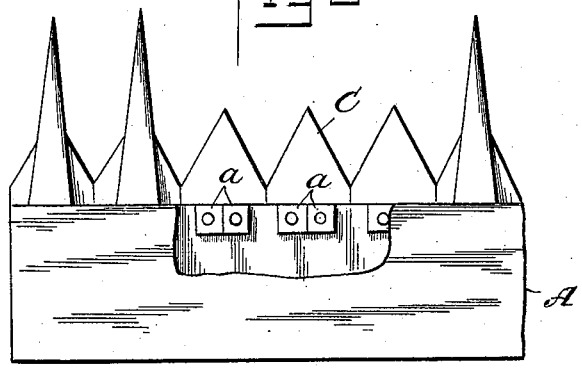
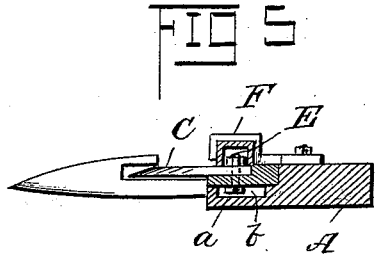
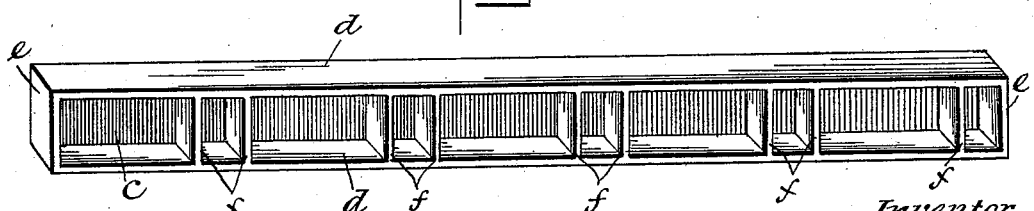
Witnesses:
Sand' R. Turner
John Lacey Phillips
Inventor.
Henry R. Stirling.
By James W. Bevans
his Atty

UNITED STATES PATENT OFFICE.

HENRY R. STIRLING, OF BARTON, ARKANSAS.

MOWING-MACHINE.

SPECIFICATION forming part of Letters Patent No. 601,911, dated April 5, 1898.

Application filed January 7, 1897. Serial No. 618,361. (No model.)

*To all whom it may concern:*

Be it known that I, HENRY R. STIRLING, a citizen of the United States, residing at Barton, in the county of Phillips and State of Arkansas, have invented certain new and useful Improvements in Mowing-Machines; and I do hereby declare the following to be a full, clear, and exact description of the invention, such as will enable others skilled in the art to which it appertains to make and use the same.

This invention relates generally to mowing-machines and the like, and particularly to an improved means for securing the knives upon the cutter-bar, the object of the invention being to provide a simple and effective locking device for preventing the accidental displacement of the securing-nuts which hold the knives upon the cutter-bar.

With the above object in view the invention consists in the novel details of construction hereinafter fully disclosed in the specification, particularly pointed out in the claims, and clearly illustrated by the accompanying drawings, in which—

Figure 1 is a perspective view of a sufficient portion of a mowing-machine with the invention applied thereto to clearly show its application. Fig. 2 is a perspective view with the locking member partly in section. Fig. 3 is a plan view of the bottom of the cutter-bar. Fig. 4 is a perspective view of the locking member. Fig. 5 is a transverse sectional view taken on line $x\ x$ of Fig. 1.

Referring now more particularly to the accompanying drawings, A designates a portion of the frame of a mowing-machine, and B the cutter-bar, to which the knives C are detachably secured by the bolts D, receiving the nuts E. These bolts are provided on their lower ends with preferably square heads $a$ of such size that when the two bolts used in securing each knife to the bar are in place said heads lie in juxtaposition, so that each bolt is locked against turning. The frame A of the machine is cut out to form a way $b$, in which said bolt-heads move as the cutter-bar is reciprocated. The locking member consists of a rectangular casing comprising a top wall $c$, side walls $d$, and end walls $e$, and is divided by the transverse walls $f$ into a plurality of compartments of such size as to each inclose the locking-nuts of one of the knives. The locking-nuts are preferably hexagonal, and the distance between the side walls of the locking member is substantially equal to the smallest diameter of said nuts, so that when the locking member is in place the side walls thereof snugly fit the nuts and prevent the same from turning.

The grips or guides carried by the frame are so formed as to extend over and embrace the locking member when the cutter-bar is in position and permit the same to reciprocate therethrough. Thus the locking member serves not only to hold the nuts securely against turning, and thus prevent their accidental displacement, but also to protect the same from dirt and the elements as well as presenting a smooth surface against which the grips can bear and obviating all danger of the breaking of the nuts or ends of the bolts by contact with the grips or other obstacles.

The grips serve a twofold purpose—namely, that of holding the locking member in place and of retaining the cutter-bar upon the frame and guiding it in its reciprocating movement.

It will be seen that the hexagonal shape of the nuts permits them to be adjusted accurately upon the bolts, while at the same time a straight face is presented to the sides of the locking member.

Having thus described my invention, what I claim as new, and desire to secure by Letters Patent, is—

1. In a machine of the character described, the combination with the cutter-bar, of knives carried thereby, bolts and nuts for securing said knives upon the bar, a locking member adapted to prevent displacement of said nuts, and grips carried by the frame of the machine for holding the cutter-bar in position, and the locking member in engagement with the nuts, substantially as described.

2. In a machine of the character described, the combination with the cutter-bar, of knives carried thereby, bolts and nuts for securing said knives upon the bar, a locking member consisting of a casing adapted to inclose said nuts and prevent their displacement, and grips carried by the frame of the machine and adapted to retain said casing and cutter-bar in position and permit the same to reciprocate therethrough, substantially as described.

3. The combination with a plurality of nuts, of a casing comprising top, side and end walls and adapted to inclose said nuts, and divided by transverse partitions in compartments of such size as to receive two nuts, whereby the same are prevented from rotating, substantially as described.

In testimony whereof I have signed this specification in the presence of two subscribing witnesses.

HENRY R. STIRLING.

Witnesses:
 E. M. FORD,
 W. J. FITZGERALD.